US008603559B2

(12) United States Patent
Perks et al.

(10) Patent No.: US 8,603,559 B2
(45) Date of Patent: Dec. 10, 2013

(54) STABLE WHIPPABLE AND WHIPPED FOOD PRODUCTS

(75) Inventors: Cheryl Perks, Ridgeway (CA); Michael Piatko, West Seneca, NY (US)

(73) Assignee: Rich Products Corporation, Buffalo, NY (US)

( * ) Notice: Subject to any disclaimer, the term of this patent is extended or adjusted under 35 U.S.C. 154(b) by 837 days.

(21) Appl. No.: 12/188,658

(22) Filed: Aug. 8, 2008

(65) Prior Publication Data

US 2009/0041919 A1 Feb. 12, 2009

Related U.S. Application Data

(60) Provisional application No. 60/955,158, filed on Aug. 10, 2007.

(51) Int. Cl.
*A23L 1/00* (2006.01)
*A23L 1/09* (2006.01)

(52) U.S. Cl.
USPC .......................................... 426/564; 426/572

(58) Field of Classification Search
USPC ................................................ 426/564, 572
See application file for complete search history.

(56) References Cited

U.S. PATENT DOCUMENTS

| 3,677,443 A * | 7/1972 | Smadar et al. ............. 222/94 |
| 4,199,605 A * | 4/1980 | Kahn et al. ............. 426/330.6 |
| 4,481,185 A | 11/1984 | Grollier et al. |
| 4,663,176 A | 5/1987 | Arden |
| 4,851,239 A | 7/1989 | Amen et al. |
| 4,857,341 A | 8/1989 | Tran et al. |
| 6,596,333 B1 * | 7/2003 | Vaghela et al. ............. 426/565 |
| 2004/0265468 A1 | 12/2004 | Perks et al. |
| 2007/0071864 A1 | 3/2007 | Arnould et al. |

FOREIGN PATENT DOCUMENTS

| WO | 9803079 A1 | 1/1998 |
| WO | WO 2004103088 A2 * | 12/2004 |
| WO | 2005070222 A1 | 8/2005 |

OTHER PUBLICATIONS

Marshall et al, Ice Cream, 2000, Aspen Publication, Fifth edition, pp. 76-79.*
Fennema, Food Chemistry, 1996, Third edition, Marcel Dekker Inc. Publishers, pp. 217 and 218.*

* cited by examiner

*Primary Examiner* — Jyoti Chawla
(74) *Attorney, Agent, or Firm* — Faye Sharpe LLP

(57) ABSTRACT

The present invention provides stable whippable or prewhipped food products comprising exudate gums in combination with proteins and optionally comprising cellulosic hydrocolloids; triglycerides; sweetener/bulking agents and water. The whippable liquid product is free of fat-based emulsifiers. The product is stable through processing and freeze/thaw and when whipped the resulting product can be used as icing, topping and filling in a dessert. The prewhipped product further comprises non-hydrogenated fat based emulsifiers but is free of other fat based emulsifiers. This product can be stored frozen and when thawed, can be directly applied as icing, topping and filling.

15 Claims, No Drawings

STABLE WHIPPABLE AND WHIPPED FOOD PRODUCTS

This application claims priority to U.S. Provisional application No. 60/955,158, filed on Aug. 10, 2007, the disclosure of which is incorporated herein by reference.

FIELD OF THE INVENTION

The present invention relates generally to the field of whippable food products and more particularly to whippable and prewhipped food products prepared with exudate gums in combination with proteins to stabilize the oil-in-water emulsion and the resulting topping.

DISCUSSION OF RELATED ART

Whippable food products are commonly used as toppings, icings, fillings and the like for cakes and other desserts. Different approaches have been used to obtain formulations that possess desirable characteristics including longer storage life, shelf life of both unwhipped and whipped products, ease of preparation and use of the whipped product, stability and performance characteristics; the conditions under which whipping can be performed including the whipping temperature; display temperature and display time; and the ease of spreading of the whipped product etc.

It has been suggested that selection of emulsifiers, stabilizers, water-soluble solids including sweeteners and inorganic salts, proteins and fats is key to the preparation of such whippable products that possess the desired characteristics and at the same time appeal to the consumer. In these formulations, typically, vegetable oils or fats are used and fat based emulsifiers are added to provide whippability and foam stability. They induce the formation of a stable emulsion and improve the rate and total aeration (whipping overrun) obtained. Fat based emulsifiers typically used to stabilize oil-in-water emulsions include, lecithin, hydroxylated lecithin; mono, di, or polyglycerides of fatty acids, such as stearin and palmitin mono and diglycerides, polyoxyethylene ethers of fatty esters of polyhydric alcohols, such as the polyoxyethylene ethers of sorbitan monostearate (polysorbate 60) or the polyoxyethylene ethers of sorbitan distearate; fatty esters of polyhydric alcohols such as sorbitan monostearate; polyglycerol esters of mono and diglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and distilled lactylated or acetylated monglycerides, and the like. As in previous oil-in-water emulsions, emulsifiers are typically employed in amounts from 0.1% to 5% of total emulsion.

Growing trends in the marketplace have indicated the move towards "All-Natural" and Organic products, resulting in the elimination of trans fats. Further, reduction in the use of hydrogenated and partially hydrogenated fats, have made it difficult to find natural fat based emulsifiers which are prepared from fats free of hydrogenation and yet retain the functionality to stabilize whip toppings prepared from oil-in-water emulsions.

Attempts to formulate products with natural emulsifiers include the use of phospholipids such as lecithin or a source of lecithin. For example, in U.S. Pat. No. 4,663,176, frozen mousse was produced in standard ice cream freezers, by blending sweetener, butterfat, cacao fat, egg yolk solids and water. These formulas require the addition of a natural fat-based emulsifier such as lecithin or inclusion of a fat-based ingredient such as egg yolk or soybean oil which contain emulsifying phospholipid lecithin. However, previously, applying the natural/and or unmodified fat-based emulsifiers, lecithin, for example, to whippable oil-in-water emulsions produced toppings of inferior quality and inferior stability compared to the toppings obtained with the aid of emulsifiers from partially hydrogenated fat or modified fat-based emulsifiers. (U.S. Pat. No. 4,481,185).

Thus, there continues to be a growing and unmet need for whip toppings stabilized by natural ingredients which provide the superior stability and quality without the use of partially hydrogenated fat based or modified fat-based emulsifiers

SUMMARY OF THE INVENTION

The present invention provides stable whippable and prewhipped formulations prepared with exudate gums which are anionic polysaccharides, in combination with proteins. The exudate gums are defined as those which are obtained as tree exudates or sap and include gum Arabic, gum Karaya and gum Tragacanth. The exudate gums can be used alone or in combination with cellulosic gum and/or carbohydrate gum.

In one embodiment, the present invention provides a whippable liquid product which is free of fat based emulsifiers. The particular combination of ingredients stabilizes the emulsion through processing and freeze/thaw so that when whipped the resulting topping has an overrun of 250%-450%, and is stable from cracking and syneresis for at least 7 days. In order to replace fat-based emulsifiers, it was found that complete substitution with alternative ingredients both stabilized the emulsion through freeze/thaw and upon thawing provided desired whippability and topping stability. The present invention used in a formulation with non-hydrogenated fats and oils, natural and/or organic flavors, colors and sweeteners make it possible to create "All-Natural" and/or Organic toppings to fulfill market demand. The whippable oil-in-water emulsion food product of the present invention can be prepared from readily available ingredients and does not require the use of fat-based emulsifiers to stabilize the emulsion or the resulting whipped product.

In another embodiment, the present invention provides a prewhipped product which contains non-hydrogenated fat-based emulsifiers, but is free of other fat based emulsifier—i.e., it is free of hydrogenated fat-based emulsifiers, partially hydrogenated fat based emulsifiers and modified fat-based emulsifier. The prewhipped product can be stored frozen and upon thawing provide a ready to use topping with desired stability. The addition of the non-hydrogenated fat-based emulsifier when added to an oil-in-water emulsion, allows for instant whipping of the emulsion resulting in a prewhipped product which has an overrun of 250%-450%, which can be stored frozen and when subsequently thawed is stable from cracking, syneresis and collapse for at least 7 days.

The whippable and prewhipped food products of the present invention have good organoleptic and stability characteristics. The products can be stored at −20° C. to −10° C. for at least a year. The whippable product can be whipped from about 7° C. to about 15° C. and whipped products can be used or displayed at up to 5 to 7° C. for at least 21 days for formulations having low solids and at up to 25° C. for at least 7 days for formulations having high solids to obtain confections including icings, toppings, fillings and the like on various food products such as cakes, desserts, beverages etc.

The whippable food product of the present invention comprises a triglyceride component, water, protein, stabilizer component (anionic exudate polysaccharide either alone or in combination with a cellulose and/or carbohydrate gum) in an amount sufficient to stabilize the product, one or more sweetener/bulking agent (sugars, sugar alcohols, artificial sweeteners) salts, buffers, and optionally thickeners/gelling agents, anti-oxidants or flavors etc. In one embodiment the whippable liquid product is substantially free of fat-based emulsifiers. The phrase "substantially free" means less than an amount that will have any detectable emulsifying effect. Those skilled in the art will recognize that trace amounts of fat based emulsifiers may be present, but such amounts are not expected to have any detectable emulsifying effect. Thus, the amount that is considered to render the composition substantially free is less than 0.05% more preferably less than 0.01% by weight. In one embodiment, the product is completely free of the fat based emulsifiers.

The microbial stability of the composition can also be increased by lowering the water activity of the composition such that it is within range of 0.75 to 0.93 and preferably 0.8 to 0.9. One exemplary method for reducing water activity in the composition is to raise the sugar solids in the composition. Thus provided is a whippable, fat-based emulsifier free composition with high microbial stability and high sugar solids and/or dissolved solids (e.g., in the range of 30 to 45 wt % of the composition). Also provided is a whippable fat-based emulsifier free composition with low sugar solids and/or dissolved solids (e.g., in the range of 10 to 30 wt % of the composition). These whipped products can be exposed to ambient temperatures for at least 7 days without developing off-tastes due to bacterial activity.

The whippable food product free of fat-based emulsifiers and having desirable shelf-life stability characteristics can be prepared by blending the dry ingredients in an aqueous solution in warm water, heating the fat, mixing and blending the oil and aqueous phases. The product is then homogenized and further cooled to achieve desired stability. The product can be stored frozen, and upon thawing, can be whipped using a routine mixer to form a whipped confection. The whippable product may be whipped with or without additional ingredients such as various forms of sugars. The product can be whipped to an overrun of up to about 450% at temperatures up to 15° C.

The prewhipped product comprises a triglyceride component, water, protein, stabilizer component (anionic exudate polysaccharide either alone or in combination with a cellulose and/or carbohydrate gum) in an amount sufficient to stabilize the product, one or more sweetener/bulking agent (sugars, sugar alcohols, artificial sweeteners), salts, buffers, and optionally thickeners/gelling agents, anti-oxidants or flavors etc. The prewhipped formulation also comprises non-hydrogenated fat based emulsifiers in range of 0.05% to 0.5%, preferably from 0.1% to 0.2%. The formulation is substantially free or completely free of other fat based emulsifiers. The prewhipped food product can be prepared by blending the dry ingredients in an aqueous solution in warm water, heating the fat, adding the non-hydrogenated fat-based emulsifier, mixing and blending the oil and aqueous phases. The product is then homogenized and further cooled and whipped immediately using a continuous mixer to the desired overrun, packaged and further frozen. After thawing, the prewhipped topping can be directly dispensed on or applied to various food items.

DETAILED DESCRIPTION OF THE INVENTION

The term "fat based emulsifiers" as used herein includes hydrogenated or partially hydrogenated fat based emulsifiers, non-hydrogenated fat based emulsifiers, and modified fat based emulsifiers. Fat based emulsifiers include lecithin (a natural emulsifier derived from animal or vegetable sources), hydroxylated lecithin; mono, di, or polyglycerides of fatty acids, such as stearin and palmitin mono and diglycerides, polyoxyethylene ethers of fatty esters of polyhydric alcohols, such as the polyoxyethylene ethers of sorbitan monostearate (polysorbate 60, 65, 80) or the polyoxyethylene ethers of sorbitan distearate; fatty esters of polyhydric alcohols such as sorbitan monostearate; polyglycerol esters of mono and diglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and distilled lactylated or acetylated monglycerides.

The term "non-hydrogenated fat based emulsifier" used herein means emulsifiers which are derived from a non-hydrogenated fat or oil source and include lecithin (a natural emulsifier derived from animal or vegetable sources), distilled monoglycerides and mono and diglyceride blends. The preferred non-hydrogenated fat-based emulsifier is a distilled monoglyceride from a palm-based fat.

By a "stable product" or "stabilizing the product" or a "product having stability" when these terms are used with respect to the whippable liquid product means that the liquid product does not separate when stored at refrigeration temperatures for at least 14 days. By a "stable product" or "stabilizing the product" or a "product having stability" when used with respect to the prewhipped product means that the prewhipped product does not collapse, crack or exhibit syneresis when stored at refrigeration temperatures or displayed on a cake up to 25° C. for at least 7 days.

All percentages presented are weight percents unless otherwise indicated. This invention provides a whippable liquid product or prewhipped food product comprising triglyceride component, protein component, stabilizer component, sweetener/bulking component, salts and water. The stabilizer component only requires exudate gums and may optionally contain cellulose or carbohydrate gum(s). The product may be a whippable liquid food product or a prewhipped product. The terms "whippable liquid product" or "whippable product" as used herein refer to the embodiment which is free or substantially free of fat-based emulsifiers and can be stored frozen in its unwhipped form. The term "prewhipped product" as used herein refers to the embodiment which contains non-hydrogenated fat based emulsifiers (but is free of other fat based emulsifiers) and can be stored frozen in a whipped form.

The whippable liquid food product is free or substantially free of fat based emulsifiers. The liquid product has desirable stability (such as with respect to emulsion breakdown, separation, gelation or inversion and storage at freezer temperatures) and the whipped confection produced therefrom also has desirable stability (such as with respect to cracking, weeping, bulging, sagging or sliding off a cake, or detectable loss of organoleptic characteristics). The whippable liquid food product of the present invention can be easily stored frozen and after thawing, can be whipped using a batch type mixer. The whipped product can be used for applications including, but not limited to, cake icing or filling, or as an ingredient to prepare and garnish desserts, beverages, pies, pastries which can be stored frozen, or displayed at refrigerated and ambient temperatures.

Although not intending to be bound by any particular theory, it is believed that the particular combinations of the ingredients including the combination of the anionic exudate polysaccharides and the protein allows the preparation of the whippable liquid formulation without the need for fat based emulsifiers described herein. Thus, in one embodiment, the formulation is prepared without any fat based emulsifiers or alternatively, without any substantial amount of fat based emulsifiers and comprises exudate gum(s), protein(s), cellulose or carbohydrate gum(s), triglyceride(s), and sweetener/bulking agent(s). Not only does the present composition not need fat based emulsifiers, but it was observed that the performance of the whipped product was better than a composition in which the fat based emulsifier (lecithin) was added or in which a partially hydrogenated fat based or a hydrogenated fat based emulsifier was added. Thus, in one embodiment, the present invention provides a "All—Natural" composition consisting essentially of one or more exudate gums; one or more proteins; a triglyceride component; and a sweetener/bulking component. More preferably, the formulation consists essentially of one or more exudate gums; one or more cellulosic hydrocolloids; one or more proteins; a triglyceride component; and a sweetener/bulking component. In another embodiment, the present invention provides a prewhipped formulation consisting essentially of one or more exudate gums; non-hydrogenated fat based emulsifier component; a protein component, a triglyceride component; and a sweetener/bulking component. More preferably, the prewhipped formulation consists essentially of one or more exudate gums; one or more cellulosic hydrocolloids; non-hydrogenated fat based emulsifiers; a protein component; a triglyceride component; and a sweetener/bulking component.

The whippable liquid formulation of the present invention comprises from 17 to 40% vegetable fats; 0.1 to 2% exudate gums; from 0.1 to 3% protein, from 0.1 to 2% cellulose gum or carbohydrate gum, from 10-60% sweetener and from 25-60% water. The whippable liquid present invention does not contain dairy fats or animal fats and is substantially free of, or is completely free of fat-based emulsifiers. The formulation can further comprise gelling agents from 0-2%; salt, anti-oxidants, flavoring agents and the like.

The prewhipped formulation of the present invention comprises from 17 to 40% vegetable fats; 0.1 to 2% exudate gums; from 0.1 to 3% protein from 0.1 to 2% cellulose gum or carbohydrate gum, from 0.05 to 2% non-hydrogenated fat-based emulsifier, from 20-60% sweetener and from 25-60% water. The prewhipped formulation does not contain dairy fats or animal fats and is substantially free of, or is completely free of hydrogenated or partially hydrogenated fat-based emulsifiers as well as modified fat based emulsifiers. The formulation can further comprise gelling agents from 0-2%; salt, anti-oxidants, flavoring agents and the like.

Representative characteristics for whipped food products and confections that are achieved according to the practice of the invention include:

a) the liquid product may be whipped with or without additional ingredients such as sugar, powdered sugar, liquid sugar and the like.

b) the liquid product as well as the prewhipped product can be stored from −20° C. to −10° C. for about a year.

c) the whipped product (prepared from the liquid product) and the prewhipped products provide dessert whipped topping, icing or filling with desirable taste and mouth characteristics.

d) the whipped product (prepared from the liquid product) can be prepared at temperatures from 7° C. to 15° C.

f) the whipped product with high solids can be used/displayed at temperatures up to 25° C. on cakes, desserts etc. for at least 7 days without any appreciable cracking, weeping, bulging, sagging or sliding off the cake or dessert.

g) the whipped product with low solids can be used/displayed at temperatures up to 7° C. for at least 21 days;

h) the products can be whipped to an overrun of up to 450%. Generally the overrun obtained is between 250 to 450%. Overrun (%) is defined as the liquid weight/volume divided by foam weight/volume.

i) The water activity is less than or equal to 0.9 for formulations with high solids and up to 0.99 for formulations with low solids.

j) the whippable liquid product as well as the prewhipped product contains an anionic exudate polysaccharide either alone or in combination with a cellulosic gum. The ratio may be 1.0 to 0.1 or 0.1 to 1.0. In some embodiments, the ratio is 1:1 k) the prewhipped product is ready to use garnish after being thawed.

l) the prewhipped product can be stored at refrigeration temperatures after thawing for at least 7 days.

The various ingredients of the whippable liquid and the prewhipped products are provided below.

Fats

The triglyceride fat component contributes to the stability of the products. The origin of the triglyceride component is non-dairy based. Thus, the fat is not dairy fat (such as butterfat). The fat is also not animal fat. Rather, the triglyceride component comprises one or more vegetable fats including, palm kernel oil, coconut oil, palm oil, or fractions thereof. The fat component may be hydrogenated. When using hydrogenated fats the iodine value should be below 5, and preferably less than 2. In one embodiment, only non-hydrogenated fats are used and in this case, the iodine value should be less than 60. In different embodiments using only non-hydrogenated fats, the iodine value is less than 35 or less than 20. One or more of the fats without the addition of other fats, can provide stability to the product. Although the product can be made with hydrogenated fats, it is preferred to use non-hydrogenated fats because it eliminates trans fats. Fully hydrogenated can also be used to reduce trans fats. The triglyceride component is between 17 to 40%.

Stabilizers

Anionic exudate polysaccharides may be employed in amounts of from 0.1% to 2%, preferably from 0.2% to 1.0% as permissible under FDA guidelines. Suitable anionic exudate polysaccharides include Arabic, Karaya, Tragacanth, and the like, and mixtures thereof.

The stabilizer component of the present invention may also include cellulosic hydrocolloids such as cellulose gums or gels, and/or carbohydrate gums. These include methylcellulose, carboxy-methylcellulose, hydroxy-propylcellulose, hydroxy-propylmethylcellulose, and microcrystalline cellulose The anionic exudate polysaccharides impart to the whippable composition a degree of emulsifiability, whippability, stability. The use of a protein source and anionic exudate polysaccharides alone results in a whippable product, which can be surprisingly, further improved by adding a cellulosic hydrocolloid. It is considered that the combination of anionic exudate polysaccharide and cellulosic hydrocolloids provides body to the whipped product (prepared from the liquid product, or the prewhipped product) as well as water binding ability. Further, it is also believed that in the prewhipped embodiment, the non-hydrogenated fat based emulsifiers enable instant whipping (whip time less than 1 minute in a continuous mixer).

Thickeners/Gelling Agents

Some gums are useful as thickeners/gelling agents. Those skilled in the art will recognize that these thickeners/gelling agents impart viscosity to the emulsion and may also help to stabilize the liquid emulsion. These gums could be natural such as plant gums or animal gums. Useful thickeners/gelling agents for this invention are gelatins, pectins, alginates, agars, carrageenans, locust beans, guars, xanthans, gellans and konjac gums, preferably alginate, pectins, xanthans and guars. Typically, a gum or combination of gums is employed with a sugar, e.g. dextrose carrier. The amount of these gums can be varied widely in accordance with the amounts known in prior art compositions, generally from 0 to 2%, preferably 0.02 to 2% or from 0.05-0.5% as permissible under FDA guidelines.

Sweeteners/Bulking Agents

Sweeteners useful for the present invention include sugars, monosaccharides, disaccharides, polysaccharides, dextrins, maltodextrins and polyols. The sugars may be reducing or non-reducing sugars. The sugar component may comprise one or more sugars, such as sucrose, fructose, dextrose, trehalose, and/or sugar syrups, such as corn syrups, and/or intensive sweeteners, such as acesulfame, thaumatin aspartame, alitame, saccharin, cyclamates, and trichloro sucrose. When creating a low glycemic index or sugar free product typical sweetener/bulking agents include maltodextrin and polyols such as: polydextrose, maltitol, erythritol, xylitol, mannitol, isomalt, lactitol, glycerin, propylene glycol and sorbitol. When creating a "Natural Product" refined sweeteners can be replaced with natural ones, such as brown rice syrup, maple syrup, barley malt, evaporated cane syrup (Invert), honey, concentrated fruit sweeteners, date sugar, Fruit Source®, fructose, glucose, Aaasake, Stevia, Sucanet® and Demerara®. For formulation calculations, all of these materials are considered to be included in the sweetener component. For taste purposes and for ease of operation, the sweetener component normally comprises sucrose or sucrose-corn syrup combinations.

In previous formulations, an increase in microbial stability was achieved by the inclusion of a high proportion of sugar solids in the composition. It will be recognized by those skilled in the art that the formulations can also have high solids. Thus, the sugar solids content of the present invention can be such that the water activity in the range of from about 0.8 to 0.9 is obtained. For formulations having low solids, the water activity can be up to 0.99.

Salts

The salts useful for the present invention are any edible salts that do not interfere with other ingredients or render an undesirable taste. Salts generally act as buffers and sequestrants. Sequestrants are considered to combine with polyvalent metal ions to form soluble metal complexes that improve the quality and stability of foods and food emulsions. Examples of useful salts are common salt (sodium chloride), and sodium, calcium and potassium: monophosphates, diphosphates, polyphosphates, citrates, chlorides, and the like.

Protein

The proteins are generally known to assist in the emulsification and stability of the whipped products. Milk proteins such as isolated sodium, potassium or calcium caseinates, protein provided as skim milk, nonfat dry milk, milk protein concentrates or isolates, whey protein concentrates or isolates, ovalbumin, alpha lactalbumin and beta lactoglobulin can be used. Vegetable proteins including but not limited to soya protein, pea protein, wheat protein, cottonseed protein, peanut protein, and corn protein are also useful. Meat proteins derived as soluble proteins from meat processing may also be used according to the practice of the invention. Egg white (free of egg yolk) may also be used. The levels can be between 0.01 to 3%. In one embodiment, the proteins are from 0.01 to 1%, or 0.01 to 2%.

Anti-Oxidants

In one embodiment of the invention, the formulation also comprises natural anti-oxidants such as extract of rosemary.

Other Ingredients

Other ingredients that are useful for the present invention include flavoring agents, colorants, vitamins, minerals, etc. Suitable flavoring agents can be employed to impart vanilla, cream, chocolate, coffee, maple, spice, mint, butter, caramel, fruit and other flavors.

The range of total fats in the present product is 17-40%, preferably between 20-30%. The total sugars solids are between 10-60%, preferably between 20-40%. The water is between 25-60% preferably between 35-55%. Various flavors can be added to the product with the range depending upon the required flavor profile.

The following table (Table 1) provides the ranges of various ingredients of the whippable product according to one embodiment of the present invention.

TABLE 1

| Ingredient | Range (wt %) | Preferred (wt %) |
| --- | --- | --- |
| Water | 25% to 60% | 35% to 55% |
| Fat | 17% to 40% | 20% to 30% |
| Exudate gum | 0.1% to 2% | 0.2% to 0.6% |
| cellulosic hydrocolloid | 0.1% to 2% | 0.2% to 0.6% |
| Salt | 0.1% to 1% | 0.1% to 0.5% |
| Anti Oxidant | 0.001 to 0.1% | 0.002% to 0.01% |
| Thickener | 0.01 to 1% | 0.04% to 0.5% |
| Flavor | 0.01% to 1% | 0.02% to 0.5% |
| sweetener/bulking agent | 10% to 60% | 20% to 40% |
| Protein | 0.1% to 3% | 0.5% to 2% |
| Non-hydrogenated fat based emulsifier (for prewhipped formulation only) | 0.05% to 0.5% | 0.1% to 0.2% |

To prepare the product, the dry ingredients are added to hot water (at about 75° C.). Sugars or sugar solutions are then added to the aqueous phase and the temperature is allowed to equilibrate to about 75° C. allowing the ingredients time to dissolve and mix. The fat (~65° C.) is added and mixed at high speed until a homogenous mixture is formed. The resulting mixture is homogenized using a two stage homogenizer to a pressure of 100 to 1000 bar (preferably 200 to 600 bar). The mixture is then pre-cooled to achieve a temperature of 30° C.-60 C, preferably to 40° C. to 50° C. with a final cool to 5° C. to 20° C., preferably to 5° C. to 15° C. The samples are preferably tempered at 5° C. to 15° C. for 1 to 48 hours to achieve desired ingredient hydration and fat structure. The tempered product can be whipped or filled in purepacks. The liquid can be direct filled without tempering, but the prewhipped formula requires 4 hours minimum tempering. The resulting product is stored and/or distributed at freezer temperatures.

To obtain a whipped confection, the whippable liquid product of the present invention can be whipped using a paddle, whip, traditional batch mixers (Hobart, Kitchen Aid, Kenwood etc), aeration devices including continuous mixers and the like. Liquid product, which is a very stable emulsion does not whip well with continuous aeration and in-line whipping devices. While not intending to be bound by any particular theory, it is considered that in the prewhipped embodiment, the non-hydrogenated fat based emulsifier, monoglyceride destabilizes the emulsion enough to allow for instant whipping through continuous whipper.

In the shelf-life study the liquid product held refrigerated for at least 30 days showed no signs of separation or inversion and no marked increase in particle size. The liquid of the prewhipped product showed increase in particle size in 48 hrs.

The products of the present invention can be whipped to an overrun of up to 450%. Typically the overrun is about 250 to 450%. While temperature plays a role in the final overrun, the product can be whipped in about 4-15 minutes at temperatures between refrigeration temperature (about 4° C.) and (about 15° C.). The whipped product is stable at refrigeration temperature for at least 7 days without loss of acceptability. The whipped product with reduced water activity is stable at ambient temperatures for at least 7 days without loss of acceptability. The whipped product can be frozen −20° C. to −10° C. for about a year without loss of acceptability.

A variety of whipped confections can be made from the product of this invention. Such confections include fillings, icings, toppings, decorations and the like which can be used for cakes, pies, cookies and the like. The toppings, icings and fillings are used according to routine methods. Further, the whipped product of the present invention may be used with other components to provide desired toppings, icings or fillings.

EXAMPLE 1

Table 2 provides examples of formulations of the present invention and comparative examples not of the present invention. Examples #1, #2, #6 and #7 are examples of whippable liquid food product free of fat-based emulsifiers. Included in the present invention Example #1 is a whippable liquid product which contains anionic exudate polysaccharide and a carbohydrate gum, and Example #2 is a whippable liquid product formulation for an "All Natural Product" which contains anionic exudate polysaccharide and a cellulosic gum. Examples #3, #5, are liquid formulations constituting comparative examples not of the present invention. Example #3 includes a natural emulsifier lecithin. Example #4 prewhipped product which includes a partially hydrogenated fat-based emulsifier. Example #5 does not contain an exudate gum in the formulation. Example #6 contains only the exudate gum in the formulation. Example #7 is an icing version (high solids) of a prewhipped product which contains high sugar solids with water activity less than 0.93 and includes non-hydrogenated fat-based emulsifier distilled monoglyceride Dimodan. Example #8 is a prewhipped product which includes non-hydrogenated fat-based emulsifier. The various formulations are made up to a 100 meaning no other ingredients were present.

Emulsion Stability, Bowl Stability After 7 Days and Cake Stability After 7 Days was evaluated after the product was whipped in a batch mixer. Prewhipped Foam Stability and Foam Stability 7 Days Prewhip Bags was evaluated after the product was whipped using a continuous mixer having aeration means.

As shown in Table 3, Examples #1, #2, and #6 exhibited stable emulsions with good overruns and when whipped gave stable foams when stored in a bowl and on a cake. Example #3 exhibited a stable emulsion with low overrun, and when whipped collapsed in the bowl and on the cake. Examples #4 and #5 exhibited poor stability as emulsions with low overruns and when whipped became rough and curdled in appearance which made them unusable on cake. Examples #7 and #8 exhibited stable emulsion with good overrun and when whipped had slight syneresis and air cell coalescence in a bowl and on a cake. The whip time using a batch mixer for #4, #5, #6, #7 and #8 was shorter (less than 10 minutes) while the whip time for #1, #2 and #3 was longer (more than 10 minutes).

To create the prewhipped product, after tempering for 4 hrs, liquid portions of each example were passed through an continuous whipper and packaged in bags or pails. Examples #1, #2 and #6 made foams with low overrun and too soft to package. Example #5 the liquid was too inverted to pass through the whipper. Example #3 made a foam with acceptable overrun and poor foam stability with syneresis and slight collapse when stored refrigerated in bags. Examples #4, #7 and #8 made foams with high overrun and stable foams when stored refrigerated in bags.

TABLE 2

| Description INGREDIENT | Example #1 wt % | Example #2 wt % | Example #3 wt % | Example #4 wt % | Example #5 wt % | Example #6 wt % | Example #7 wt % | Example #8 wt % |
|---|---|---|---|---|---|---|---|---|
| Palm Kernel Oil/Coconut Oil Blend unhydrogenated | 25 | 25 | 25 | 25 | 25 | 24 | | |
| Palm Kernel Oil/Palm Oil Blend unhydrogenated | | | | | | | 25 | 24 |
| Exudate Gum (Arabic Gum) | 0.25 | 0.25 | 0.25 | 0.25 | | 0.3 | 0.25 | 0.3 |
| Cellulose Gum (Microcrystalline cellulose) | | 0.2 | | | | | | |
| Carbohydrate Gum (Hydroxypropylmethylcellulose) | 0.25 | | 0.25 | 0.25 | 0.25 | | 0.25 | 0.3 |
| Caseinate Sodium | 1.2 | | 1.5 | 1.2 | 1.2 | 1 | 1.25 | 1.5 |
| Soy Protein | | 1.75 | | | | 0.5 | | |
| Distilled Monoglycerides from unhydrogenated fat DIMODAN | | | | | 0.2 | | | |
| Distilled Monoglycerides from unhydrogenated fat DIMODAN | | | | | | | 0.12 | 0.12 |
| Lecithin | | | 0.2 | | 0.2 | | | |
| Xanthan gum | 0.1 | 0.1 | 0.1 | 0.1 | 0.1 | 0.08 | 0.08 | 0.12 |
| Water | 47 | 46.35 | 46.65 | 46.8 | 45.05 | 51.92 | 30.97 | 44.04 |
| Sugar | 8 | 18 | 8 | 8 | 12 | 12 | | 12 |
| Corn Syrup | 16 | | 16 | 16 | 14 | 10 | 14 | 17 |

TABLE 2-continued

| Description INGREDIENT | Example #1 wt % | Example #2 wt % | Example #3 wt % | Example #4 wt % | Example #5 wt % | Example #6 wt % | Example #7 wt % | Example #8 wt % |
|---|---|---|---|---|---|---|---|---|
| Invert Syrup | | 8 | | | | | 28 | |
| Dextrose | 2 | | 2 | 2 | 2 | | | 0.4 |
| Antioxidant extract from Rosemary | | 0.004 | | | | | | |
| Vanilla Natural Flavor | 0.05 | 0.1 | 0.05 | 0.05 | 0.05 | 0.05 | 0.1 | 0.06 |
| Rice Extract | | 0.096 | | | | | | 0.04 |
| Salt | 0.15 | 0.15 | 0.15 | 0.15 | 0.15 | 0.15 | 0.1 | 0.12 |
| Total | 100 | 100 | 100 | 100 | 100 | 100 | 100 | 100 |

TABLE 3

| | Example #1 | Example #2 | Example #3 | Example #4 | Example #5 | Example #6 | Example #7 | Example #8 |
|---|---|---|---|---|---|---|---|---|
| Emulsion Stability | 5C | 5C | 5C | 5C | 5C | 5C | 5C | 5C |
| Inversion 1 Week @ 8c | None | None | None | Partially Inverted | Inverted | None | None | None |
| Whip Time(Min) -using batch mixer | 15 | 12.3 | 14 | 5 | 2 | 6 | 6.4 | 8.5 |
| Over Run (%) | 358 | 330 | 230 | 260 | 130 | 340 | 290 | 360 |
| Pastry Bag Time (Min) | 75 | 45 | 15 | 5 | 0 | 30 | 15 | 60 |
| Surface Roughness | Smooth | Smooth | Smooth | Rough | Rough | Smooth | Smooth | Smooth |
| Bowl Stability After 7 Days | 5C | 5C | 5C | 5C | 5C | 5C | 25C | 5C |
| Syneresis In Bowl | None | None | Slight | None | None | None | Slight | Slight |
| Air Cell Coalescence | None | None | Heavy | None | None | None | Slight | Slight |
| Cake Stability After 7 Days | 5C | 5C | 5C | 5C | 5C | 5C | 25C | 5C |
| Appearance On Cake | Smooth | Smooth | Smooth | N/A | N/A | Smooth | Smooth | Slight rough |
| Cracking On Cake | None | None | Heavy | N/A | N/A | None | None | None |
| Air Cell Coalescence | None | None | Heavy | N/A | N/A | None | Slight | Slight |
| Foam Collapse | None | None | Collapse | N/A | N/A | None | None | None |
| Prewhipped Foam Stability | 5C | 5C | 5C | 5C | 5C | 5C | 5C | 5C |
| Prewhipped Over Run (%) | 235 | 210 | 320 | 365 | N/A | 230 | 280 | 388 |
| Appearance | N/A | N/A | Rough | Smooth | N/A | N/A | Smooth | Smooth |
| Rosette Definition (Sharp Defined Edges Desirable) | N/A | N/A | Round Edges | Sharp Edges | N/A | N/A | Sharp Edges | Sharp Edges |
| Foam Stability 7 Days Prewhip Bags | 5C | 5C | 5C | 5C | 5C | 5C | 5C | 5C |
| Rosette Definition | N/A | N/A | Rough | Sharp | N/A | N/A | Sharp | Sharp |
| Syneresis In Bag | N/A | N/A | Medium | None | N/A | N/A | None | None |
| Foam Collapse | N/A | N/A | Slight | None | N/A | N/A | None | None |

EXAMPLE 2

In this example the particle size of the emulsion was measured after preparation and after desired periods of time as an indicator of the stability of the emulsion. Particle size was measured on the Melvern Mastersizer 2000. Results are shown in Table 4. The reading "d (0.9)" means that 90% of the particles have a size below the indicated number. Increasing changes in d (0.9) indicates growth of particles. Growth of particle size indicates coagulation of fat which is correlated with emulsion instability. The term (NSD) means that the values are not significantly different based on the 25% CV or coefficient of variation inherent in the method.

Examples #1, #2 and #6 show little change in particle size indicating stable emulsions. Examples #3, #4, #5, #7 and #8 all show increase in particle size which indicates emulsion instability. Example #5 shows a large increase in particle size which indicates significant emulsion instability.

D[3,2]—Surface Weighted Mean (also defined as Sauter Mean Diameter) is the average particle size based on the specific surface per unit volume (M. Alderliesten, *A Nomenclature for Mean Particle Diameters*; Anal. Proc., vol. 21, May 1984, pages 167-172). This measurement gives a comparison of mean particle size for each emulsion. Ideally a stable oil-in-water emulsion achieves a mean particle size between 0.1 to 1.0 microns. Examples #1, #2, #6, #7 and #8 all initially exhibit a mean particle size or less than or equal to 1 micron which demonstrates homogenization was effective to achieve a good emulsion. Examples #3, #4 and #5 all initially exhibit a particle size greater than 3 microns. Since all the emulsions were homogenized at the same pressure and temperature, this demonstrates that the emulsion is not at a stable state and started to change almost immediately. The increase in the mean particle size measured after 48 hours further displays the emulsion instability of examples #3, #4 and #5.

TABLE 4

| Sample Name | d (0.9) | D [3, 2] - Surface weighted mean | % Change in d (0.9) over 48 hrs | % Change in surface weighted mean over 48 hrs |
|---|---|---|---|---|
| Example #1 Initial | 1.157 | 0.303 | | |
| Example #1 48 hrs | 1.347 | 0.329 | NSD | NSD |
| Example #1 15 days | 2.308 | 0.515 | | |
| Example #1 30 days | 4.698 | 2.74 | | |
| Example # 2 (initial particle size) | 24.862 | 0.579 | | |
| Example # 2 (48 hr particle size) | 27.551 | 0.581 | NSD | NSD |
| Example # 3 (initial particle size) | 29.616 | 6.637 | | |
| Example # 3 (48 hrs particle size) | 56.289 | 9.977 | 90 | 50 |
| Example # 4 (initial particle size) | 6.415 | 3.085 | | |
| Example # 4 (48 hrs particle size) | 114.78 | 4.699 | 1689 | 52 |
| Example # 5 (initial particle size) | 60.407 | 4.725 | | |
| Example # 5 (48 hrs particle size) | 221.84 | 10.111 | 267 | 114 |
| Example # 6 (initial particle size) | 0.887 | 0.296 | | |
| Example # 6 (48 hrs particle size) | 1.021 | 0.358 | NSD | NSD |
| Example # 7 (initial particle size) | 2.936 | 0.341 | | |
| Example # 7 (48 hrs particle size) | 4.556 | 0.55 | 55 | 61 |
| Example # 8 (initial particle size) | 25.756 | 1.115 | | |
| Example # 8 (48 hrs particle size) | 66.622 | 1.884 | 159 | 69 |

While the present invention has been described through specific examples, routine modifications to the embodiments presented herein will be apparent to those skilled in the art and such modifications are intended to be within the scope of the present invention.

The invention claimed is:

1. A whippable liquid food product which is free of fat based emulsifiers, said whippable food product comprising about 0.1-2% cellostic hydrocolloid, about 0.02-2.0% gelling agent, about 17-40% triglyceride fat, about 10-60% sweetener, about 0.1 to 2% exudate gum, about 0.1 to 3% protein, and about 25-60% water; said cellulosic hydrocolloid including one or more compounds selected from the group consisting of cellulose gum, cellulose gel and carbohydrate gum; said exudate gum including one or more compounds selected from the group consisting of Arabic gum, Karaya gum, and Tragacanth gum; said triglyceride fat is nonhydrogenated; said triglyceride fat including one or more compounds selected from the group consisting of palm kernel oil, coconut oil, and palm oil; said gelling agent including one or more compounds selected from the group consisting of gelatins, pectins, alginates, agars, carrageenans, locust beans, guars, xanthans, gellans and konjac gum, salt and anti-oxidants; said protein including one or more compounds selected from the group consisting of milk protein, soy protein and egg protein;
   wherein said whipped product can be stored at −20° C. to −10° C. for at least one year; and,
   wherein said whipped product is whippable after freezing and thawing, can be whipped from 7° C. to 15° C. with an overrun of 250% to 400%, said whipped product can be used or displayed up to 7° C. for at least 21 days, said whippable food product is free of dairy fat, a water activity of said whipped product is about 0.75-0.93.

2. The whippable food product as defined in claim 1, wherein said cellulosic hydrocolloid including one or more compounds selected from the group consisting of methylcellulose, carboxy-methylcellulose, hydroxy-propylcellulose, hydroxy-propylmethylcellulose, and microcrystalline cellulose.

3. The whippable food product as defined in claim 2, wherein said water activity is about 0.8 to 0.9.

4. The whippable food product as defined in claim 3, wherein said cellulosic hydrocolloid is from about 0.2 to 0.6%, said protein is from about 0.2 to 2.0%, said triglyceride fat is from about 20 to 30%, said exudate gum is from about 0.2 to 0.6%, and said sweetener is from about 20 to 40%.

5. The whippable food product as defined in claim 1, wherein said water activity is about 0.8 to 0.9.

6. The whippable food product as defined in claim 1, wherein said cellulosic hydrocolloid is from about 0.2 to 0.6%, said protein is from about 0.2 to 2.0%, said triglyceride fat is from about 20 to 30%, said exudate gum is from about 0.2 to 0.6%, and said sweetener is from about 20 to 40%.

7. A whipped product made by whipping the product of claim 1.

8. The whippable food product as defined in claim 1, comprising in weight percent:

| | |
|---|---|
| Water | 25% to 60% |
| Fat | 17% to 40% |
| Exudate Gum | 0.1% to 2% |
| cellulostic hydrocolloid | 0.1% to 2% |
| Salt | 0.1% to 1% |
| Anti Oxidant | 0.001% to 0.1% |
| Thickener | 0.01% to 1% |
| Flavor | 0.01% to 1% |
| sweetener/bulking agent | 10% to 60% |
| Protein | 0.1% to 3%. |

9. A whipped product made by whipping the product of claim 8.

10. The whippable food product as defined in claim 1, comprising in weight percent:

| | |
|---|---|
| Water | 25% to 60% |
| Fat | 17% to 40% |
| Exudate Gum | 0.1% to 2% |
| cellulostic hydrocolloid | 0.1% to 2% |
| Salt | 0.1% to 1% |
| Anti Oxidant | 0.001% to 0.1% |
| Thickener | 0.01% to 1% |
| Flavor | 0.01% to 1% |
| sweetener/bulking agent | 10% to 60% |
| Protein | 0.1% to 3%. |

11. A whipped product made by whipping the product of claim 10.

12. The whippable food product as defined in claim 1, comprising in weight percent:

| | |
|---|---|
| Water | 35% to 55% |
| Fat | 20% to 30% |
| Exudate Gum | 0.2% to 0.6% |
| cellulostic hydrocolloid | 0.2% to 0.6% |
| Salt | 0.1% to 0.5% |
| Anti Oxidant | 0.002% to 0.01% |
| Thickener | 0.04% to 0.5% |
| Flavor | 0.02% to 0.5% |
| sweetener/bulking agent | 20% to 40% |
| Protein | 0.5% to 2%. |

13. A whipped product made by whipping the product of claim 12.

14. The whippable food product as defined in claim 1, comprising in weight percent:

| | |
|---|---|
| Water | 35% to 55% |
| Fat | 20% to 30% |
| Exudate Gum | 0.2% to 0.6% |
| cellulostic hydrocolloid | 0.2% to 0.6% |
| Salt | 0.1% to 0.5% |
| Anti Oxidant | 0.002% to 0.01% |
| Thickener | 0.04% to 0.5% |
| Flavor | 0.02% to 0.5% |
| sweetener/bulking agent | 20% to 40% |
| Protein | 0.5% to 2%. |

15. A whipped product made by whipping the product of claim 14.

* * * * *